Oct. 21, 1958 — G. A. LYON — 2,857,207
WHEEL COVER
Filed Feb. 10, 1955
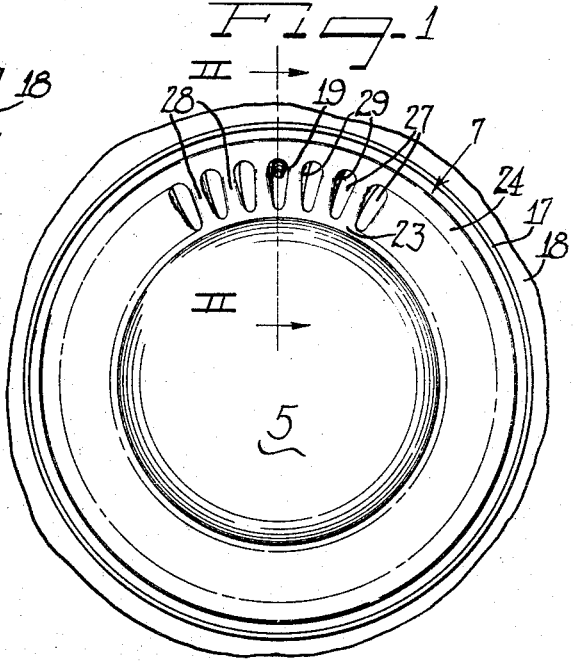
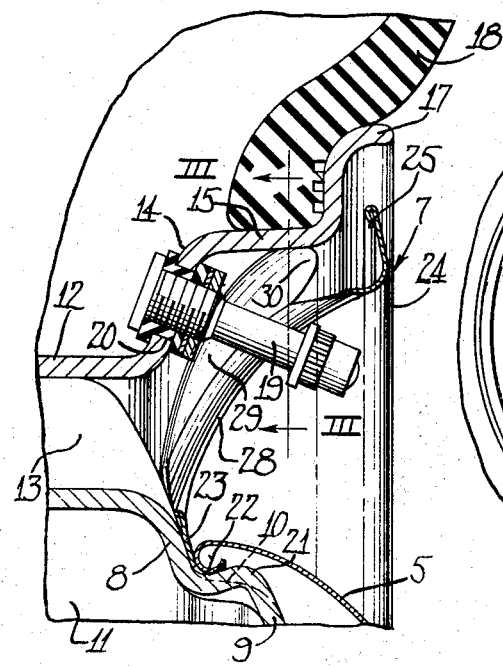
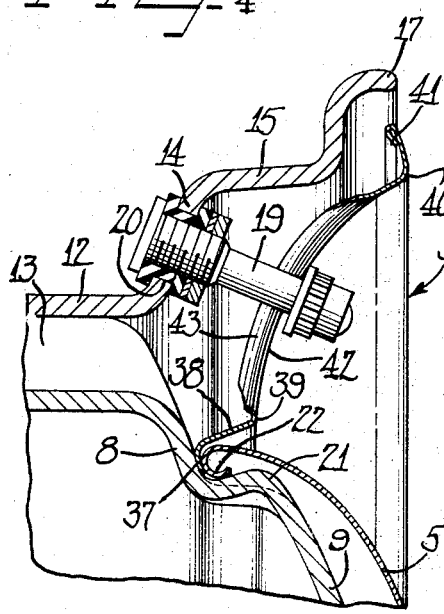
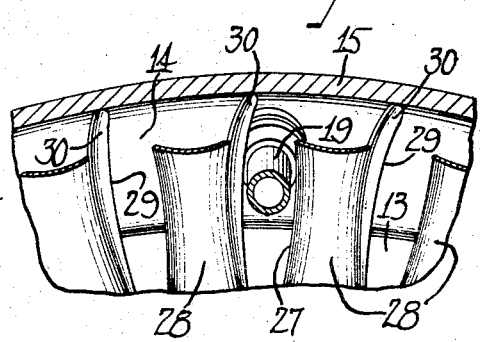
*Inventor*
George Albert Lyon

United States Patent Office 2,857,207
Patented Oct. 21, 1958

2,857,207

WHEEL COVER

George Albert Lyon, Detroit, Mich.

Application February 10, 1955, Serial No. 487,363

10 Claims. (Cl. 301—37)

The present invention relates to improvements in the ornamental and protective covering of vehicle wheels and more particularly relates to a novel cover structure for disposition at the outer side of a wheel.

An important object of the present invention is to provide an improved wheel structure wherein an ornamental and protective cover cooperates with air circulation openings through the wheel to promote movement of air therethrough.

Another object of the invention is to provide an improved wheel cover construction for disposition at the outer side of a vehicle wheel.

A further object of the invention is to provide an improved multi-part wheel cover assembly.

Still another object of the invention is to provide an improved trim ring structure for disposition at the outer side of a vehicle wheel and adapted for improved air circulation through the wheel.

Other objects, features and advantages of the present invention will be readily apparent from the following detailed description of certain preferred embodiments thereof taken in conjunction with the accompanying drawings, in which:

Figure 1 is an outer side elevational view of a vehicle wheel embodying features of the invention.

Figure 2 is an enlarged fragmentary radial sectional detail view taken substantially on the line II—II of Fig. 1.

Figure 3 is a fragmentary sectional detail view, partially in elevation and partially in section taken substantially on the line III—III of Fig. 2; and Figure 4 is a radial sectional view similar to Fig. 2 but showing a modification of the cover assembly.

According to the present invention, a novel cover assembly including a hub cap 5 and a trim member 7 is provided for disposition at the outer side of a vehicle wheel of the disk spider body type, having a body 8 of the type covered in my Patent 2,445,330 issued July 20, 1948. Such a wheel body has an annular nose bulge 9 provided with a radially outwardly facing annular shoulder 10 spaced radially inwardly from an axially inwardly directed outer peripheral attachment flange 11 suitably attached to a base flange 12 of a multi-flange, drop center tire rim. At suitable intervals such as three or four the flange 11 is inset to provide air circulation openings 13.

Projecting generally radially outwardly from the base flange 12 is a side flange 14 which merges with a generally axially and radially outwardly sloping intermediate flange 15 from the outer margin of which extends a terminal flange 17. A tubeless pneumatic tire 18 is adapted to be supported by the tire rim, and a metal tube valve stem 19 is operatively mounted in a valve stem opening 20 in the side flange 14.

For snap-on, pry-off attachment of the hub cap 5, a plurality of circumferentially uniformly spaced generally radially outwardly projecting retaining bumps 21 are provided on the shoulder 10 for resilient retaining engagement by an underturned peripheral bead 22 of the hub cap. There may be three of the retaining bumps 21.

The trim member 7 is constructed and arranged to overlie the wheel from the margin of the hub cap 5 to substantially covering relation to the tire rim. To this end, the trim member 7 comprises a sheet metal annulus made from suitable thin resilient sheet metal such as stainless steel or brass which may be polished and plated to provide the same with a bright, lustrous finish. At its inner margin the cover annulus 7 is provided with an annular continuous flange 23 of slightly smaller inside diameter than the peripheral diameter of the hub cap 5 and arranged to bottom in face-to-face relation against the wheel body radially outwardly about the retaining bumps 21 in such relation as to be clamped to the wheel body by the retaining bead 22 of the hub cap.

From the inner marginal flange 23, the cover member 7 extends generally radially and axially outwardly for overlying the wheel openings 13 and the juncture of the wheel body with the tire rim and in spaced relation to the flanges of the tire rim. At its outer extremity the cover member 7 has a generally radially arched, annular reinforcing rib-like outer marginal flange 24 which in assembly with the wheel is arranged to lie opposite the radially inner portion of the terminal flange 17 in spaced relation and is provided with an underturned reinforcing and finishing bead-like flange 25.

Intermediate the inner and outer marginal annular portions 23 and 24, the cover member 7 is provided with a circumferentially spaced annular series of radially elongated generally ovate openings 27 having the narrow ends thereof adjacent the inner marginal flange 23 and the wider ends thereof adjacent the outer marginal portion 24 of the cover member. The length of the openings 27 is such as to lie opposite the wheel openings 13, with the larger portions of the openings 27 generally opposite the radially outer sides of the wheel openings 13 and adjacent the axially outer portion of the intermediate flange 15 of the tire rim. It will thus be apparent that large air circulation passage, in the aggregate, is provided through the cover member 24 while at the same time substantial space between the cover member 7, including the outer marginal cover portion 24, and the tire rim affords an air gap. Therefore, in the rotation of the wheel air may circulate with substantial freedom through the wheel openings 13 and the cover openings 27 and the gap.

Between the openings 27 are provided alternating substantially rigid rib-like spokes 28 connecting the radially inner and outer marginal flange portions 23 and 24 of the cover member 7. Not only are the spokes 28 transversely outwardly convex, and inwardly concave to afford the rib-like structure thereof, but the spokes are also of inwardly concave or arched form longitudinally. This combination of transverse and longitudinal arching of the ribs 28 renders the same substantially rigid.

To provide not only for retention of the cover member 7 on the wheel independently of the hub cap 5, but also to promote air circulation through the gap between the cover member 7 and the tire rim and through the wheel openings 13, as well as through the cover openings 27, cover retaining finger vanes 29 are provided on the spokes 28.

Conveniently, the finger vanes 29 may be formed integrally in one piece with the spokes 28 from material derived in striking out the openings 27. To this end, the material struck from the intermediate portion of the cover member 7 in producing each of the openings 27 is pressed generally axially inwardly as an elongated, generally ovate flange along one side of one of the spokes defining the opening and as an inward extension of the continuous inturned lip or reinforcing flange defining each of the openings.

For cover retaining engagement with the wheel and more particularly the intermediate flange 15 of the tire rim, each of the finger vane members 29 has at the outer, larger width portion thereof a free resiliency flexible generally radially outwardly extending retaining finger tip or terminal 30 underlying the outer marginal cover portion 24 and normally extending to an extremity diameter which is slightly greater than the inside diameter of the axially outer portion of the intermediate flange 15. By having the tip portions 30 angled on a more or less volute curvature in one circumferential direction, and by having the vane finger flanges 29 curved transversely across the axis thereof not only is the air motivating function of the vane flanges enhanced but press-on engagement of the vane finger tips 30 with the intermediate flange 15 is facilitated. It will be observed that the retaining finger vane flanges 29 have substantial resilient resistance to deformation in their axial direction by reason of the substantial length thereof and the long juncture connection with the contiguous spoke 28.

In applying the cover member 7 to the outer side of the wheel, the valve stem 19 is registered to extend through one of the openings 27 in the cover, and the retaining finger terminals 30 of the vane flanges 29 are cammed into retaining engagement with the intermediate flange 15 of the tire rim. Inward pressure on the cover member 7 is continued until the flange 23 at the inner margin thereof bottoms against the wheel body 8 radially outwardly adjacent to the bumps 21. Thereafter the hub cap 5 may be applied to the outer side of the wheel by snapping it onto the bumps 21 and into clamping engagement with the flange 23. From the outer side of the wheel the assembly appears as though the wheel were covered by a full cover.

Turning of the cover member 7 on the wheel is prevented to a substantial extent, and quite effectively at least in one rotary direction by the retaining finger terminals 30 more or less bitingly engaging the tire rim. In addition, the metal valve stem 19 cooperating with the adjacent generally axially inwardly turned sides of the spokes 28 will avoid any substantial turning.

As the wheel rotates, the vane flanges 29 assist in moving air through the wheel openings 13 and the gap between the cover member 7 and the tire rim, and also through the openings 27 in the cover. It will be observed that due to the generally scoop-like curved, volute shape of the vane flanges 29, during rotation of the cover in one rotary or circumferential direction air movement will be assisted in an outward direction while in the opposite rotary direction of the wheel air will be assisted to move inwardly relative to the cover and wheel.

For removing the cover member 7 from the wheel, after the hub cap 5 has been removed from the wheel, a pry-off tool such as a screw driver or the like may be applied behind the rigid outer annular portion 24 of the cover and pry-off leverage applied to cause the retaining finger terminals 30 to slide axially outwardly and release the cover member from the wheel.

In the modification of Fig. 4, an annular wheel cover member 35 is constructed and arranged to be applied to the outer side of a wheel of substantially the same construction as the wheel in Fig. 2 and accordingly similar reference numerals indicate similar parts of the wheel. The hub cap 5 is also the same as in Fig. 2.

At its inner margin the annular cover member 35 has a generally radially inwardly extending terminal flange 37 for underlying the marginal bead 22 of the hub cap, and by preference the inner edge of the flange 37 is of at least slightly smaller diameter than the diameter described about the retaining bumps 21 of the wheel body so that as a preliminary, the cover member 35 can be at least loosely held on the wheel by the retaining bumps 21 until the hub cap 5 is applied to the outer side of the wheel. Extending generally axially outwardly from the juncture with the terminal flange 37, is an offsetting flange portion 38 which joins a generally axially outwardly projecting pry-off ridge or rib 39 annularly surrounding the adjacent margin of the hub cap and spaced radially and axially outwardly from the inner edge of the hub cap so as to enable application of a pry-off tool into the gap between the flange portion 38 and the edge of the hub cap and leverage of the pry-off tool against the pry-off rib 39.

At the radially outer margin thereof the cover member 35 has a substantially rigid annular rib-like marginal portion 40 provided with an underturned reinforcing and finishing bead edge portion 41. The outer marginal portion 40 lies in assembly in axially outwardly spaced relation to the terminal flange 17 of the tire rim.

The inner and outer marginal portions of the cover member 35 are joined by a generally radially and axially outwardly extending intermediate portion of substantial width overlying the wheel openings 13 and the outer side of the tire rim and cooperating with the outer portion 40 to provide a substantial air gap therebetween. The intermediate portion of the cover 35 is subdivided, similarly as the cover 7, into a series of generally radially extending substantially rigid ribs 42 having both longitudinal and transversely arched, reinforced shape. Similarly as in the cover member 7, the rib spokes 42 afford substantial openings therebetween through which air may circulate through the cover.

In the cover 35, the openings are defined by generally axially inwardly directed respective continuous flanges 43 which provide the turned-in sides of the rib spokes 42 and the ends of the respective openings. It will be noted that substantially this same construction is present in the cover 7. If desired, material struck from the openings through the cover 35 may be formed into air motivating, cover retaining vanes similarly as in the cover 7, but in this instance such vane flanges are omitted from the cover 35.

Application of the cover 35 to the outer side of the wheel is effected by centering the valve stem 19 through one of the openings in the intermediate portion of the cover member and then pressing the inner terminal flange 37 over the retaining bumps 21. Thereafter the hub cap 5 can be applied to the outer side of the wheel into clamping engagement of the retaining bead 21 of the hub cap with the inner marginal flange 37. When it is desired to remove the hub cap 5, a pry-off tool is applied to the outer edge thereof and levered against the pry-off rib or ridge or shoulder 39. After removal of the hub cap, the trim ring member 35 can be easily removed by pulling the same free from the wheel.

It will be understood that modifications and variations may be effected without departing from the scope of the novel concepts of the present invention.

I claim as my invention:

1. In a wheel structure including a wheel body and a tire rim with openings through the wheel adjacent juncture of the wheel body and tire rim for air circulation, a cover for disposition at the outer side of the wheel including a circular inner portion for bottoming against the wheel body and held in retained assembly thereagainst and a circular outer marginal portion for overlying the outer side of the tire rim in spaced relation in annular air gap relation with an intermediate annular portion of substantial width subdivided into a plurality of spokes with substantial openings between the spokes for air circulation, whereby to afford combined air circulation through said gap and said cover openings in the service rotation of the wheel and movement of air through said wheel openings, said spokes being of longitudinally and transversely arched substantially rigid structure connecting the radially inner and outer portions of the cover rigidly together.

2. In a wheel structure including a wheel body and a tire rim with openings through the wheel adjacent juncture of the wheel body and tire rim for air circulation, a cover for disposition at the outer side of the wheel including a circular inner portion for bottoming against the wheel body and a circular outer marginal portion for overlying the outer side of the tire rim in spaced relation with an intermediate annular portion of substantial width subdivided into a plurality of spokes with substantial openings between the spokes for air circulation, said spokes being of longitudinally and transversely arched substantially rigid structure connecting the radially inner and outer portions of the cover rigidly together, the sides of the spokes having air circulation promoting vane flanges projecting inwardly therefrom and provided with generally radially projecting cover retaining edges engageable with an opposing generally radially facing wheel flange portion.

3. In a wheel structure including a wheel body and a tire rim with openings through the wheel adjacent juncture of the wheel body and tire rim for air circulation, a cover for disposition at the outer side of the wheel including a circular inner portion for bottoming against the wheel body and a circular outer marginal portion for overlying the outer side of the tire rim in spaced relation with an intermediate annular portion of substantial width subdivided into a plurality of spokes with substantial openings between the spokes for air circulation, said spokes being of longitudinally and transversely arched substantially rigid structure connecting the radially inner and outer portions of the cover rigidly together, the sides of the spokes having air circulation promoting vane flanges projecting inwardly therefrom, said vane flanges being of generally volute cross sectional shape for air moving function in the rotation of the wheel.

4. In a wheel structure including a wheel body and a tire rim with openings through the wheel adjacent juncture of the wheel body and tire rim for air circulation, a cover for disposition at the outer side of the wheel including a circular inner portion for bottoming against the wheel body and a circular outer marginal portion for overlying the outer side of the tire rim in spaced relation with an intermediate annular portion of substantial width subdivided into a plurality of spokes with substantial openings between the spokes for air circulation, said spokes being of longitudinally and transversely arched substantially rigid structure connecting the radially inner and outer portions of the cover rigidly together, the sides of the spokes having air circulation promoting vane flanges projecting inwardly therefrom, said vane flanges being of generally volute cross sectional shape for air moving function in the rotation of the wheel, said vane flanges having generally radially extending resiliently flexible retaining finger terminals for retaining engagement with the wheel.

5. In a wheel structure, a wheel body and a tire rim with openings through the wheel adjacent juncture of the wheel body and tire rim and with retaining bumps on the wheel body radially inwardly from the openings, a hub cap for disposition at the outer side of the wheel body and having a margin for retaining engagement with the wheel bumps, and a trim ring annulus for disposition over the tire rim and extending to the wheel body adjacent said bumps for clamping against the wheel body by the edge of the hub cap, said trim ring annulus having an inner marginal flange engageable with the wheel body and supporting the remainder of the annulus in spaced relation to not only the wheel body but also the tire rim so that there is a substantial annular air gap between the outer annular portion of the annulus and the tire rim, an intermediate portion of the annulus being apertured to provide an annular series of spokes connecting the radially inner and outer annular portions of the annulus and affording substantial aggregate air circulation opening through said intermediate portion supplemental to said air gap, said spokes being transversely and longitudinally arched for stiffness.

6. In a wheel structure, a wheel body and a tire rim with openings through the wheel adjacent juncture of the wheel body and tire rim and with retaining bumps on the wheel body radially inwardly from the openings, a hub cap for disposition at the outer side of the wheel body and having a margin for retaining engagement with the wheel bumps, and a trim ring annulus for disposition over the tire rim and extending to the wheel body adjacent said bumps for clamping against the wheel body by the edge of the hub cap, said trim ring annulus having an inner marginal flange engageable with the wheel body and supporting the remainder of the annulus in spaced relation to not only the wheel body but also the tire rim, an intermediate portion of the annulus being generally radially apertured to provide an annular series of spokes connecting the radially inner and outer annular portions of the annulus, said spokes being transversely and longitudinally arched for stiffness, said spokes having along one side thereof air motivating vanes elongated in a generally radial direction to overlie the wheel openings and the tire rim and being curved to enhance the air motivating function thereof in the rotation of the wheel, said vanes having generally radially and axially outwardly projecting flexible retaining terminals engageable in press-on, pry-off relation with a flange of the tire rim.

7. In a cover for disposition at the outer side of a vehicle wheel, a circular cover member having an inner portion for engagement with a wheel body and a radially outer portion for disposition in spaced relation to a tire rim, with generally radially extending longitudinally and transversely arched spokes integral in one piece with said radially inner and outer portions and providing generally radially elongated air circulation openings therethrough for cooperation with openings through the wheel for air circulation, said spokes having at one of the sides thereof generally radially outwardly and axially inwardly directed elongated generally ovate air circulation promoting vane flanges, said vane flanges having radially extending resiliently flexible free retaining terminals.

8. In a wheel structure including a wheel body and a tire rim with openings through the wheel adjacent juncture of the wheel body and tire rim for air circulation, a cover for disposition at the outer side of the wheel including a circular inner portion for bottoming against the wheel body and held in retained assembly thereagainst and a circular outer marginal portion for overlying the outer side of the tire rim in spaced relation in annular air gap relation with an intermediate annular portion of substantial width subdivided into a plurality of spokes with substantial openings between the spokes for air circulation, whereby to afford combined air circulation through said gap and said cover openings in the service rotation of the wheel and movement of air through said wheel openings, said spokes being of longitudinally and transversely arched substantially rigid structure connecting the radially inner and outer portions of the cover rigidly together, and air circulation promoting vanes carried by said spokes.

9. In a wheel structure including a wheel body and a tire rim with openings through the wheel adjacent juncture of the wheel body and tire rim for air circulation, a cover for disposition at the outer side of the wheel including a circular inner portion for bottoming against the wheel body and held in retained assembly thereagainst and a circular outer marginal portion for overlying the outer side of the tire rim in spaced relation in annular air gap relation with an intermediate annular portion of substantial width subdivided into a plurality of spokes with substantial openings between the spokes for air circulation, whereby to afford combined air circulation through said gap and said cover openings in the service rotation of the wheel and movement of air through said wheel openings, said spokes being of longitudinally and transversely arched substantially rigid structure connecting the radially inner and outer portions of the cover rigidly together, and air circulation promoting vanes carried by said spokes, said vanes being disposed to project axially inwardly behind said outer marginal cover portion into the space between the cover and the tire rim.

10. In a wheel structure including a wheel body and a tire rim with openings through the wheel adjacent juncture of the wheel body and tire rim for air circulation, a cover of one piece sheet metal structure for disposition at the outer side of the wheel including a circular inner portion for bottoming against the wheel body and held in retained assembly thereagainst and a circular outer marginal portion for overlying the outer side of the tire rim in spaced relation in annular air gap relation with an intermediate annular portion of substantial width subdivided into a plurality of spokes with substantial openings between the spokes for air circulation, whereby to afford combined air circulation through said gap and said cover openings in the service rotation of the wheel and movement of air through said wheel openings, said spokes being of longitudinally and transversely arched substantially rigid structure connecting the radially inner and outer portions of the cover rigidly together, and retaining flange portions derived from material struck from between the spokes to afford said openings and resiliently retainingly engageable with a radially facing flange portion of the wheel.

References Cited in the file of this patent

UNITED STATES PATENTS

| | | |
|---|---|---|
| 2,130,207 | Van Halteren | Sept. 13, 1938 |
| 2,160,272 | Kranz | May 30, 1939 |
| 2,198,056 | Lyon | Apr. 23, 1940 |
| 2,544,703 | Lyon | Mar. 13, 1951 |
| 2,660,478 | Lyon | Nov. 24, 1953 |